(12) United States Patent
Takeshima et al.

(10) Patent No.: US 8,409,356 B2
(45) Date of Patent: Apr. 2, 2013

(54) METHOD FOR GLYCOSYLATING AND SEPARATING PLANT FIBER MATERIAL

(75) Inventors: Shinichi Takeshima, Numazu (JP); Takeshi Kikuchi, Sakura (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 93 days.

(21) Appl. No.: 12/995,784

(22) PCT Filed: Jun. 2, 2009

(86) PCT No.: PCT/IB2009/005920
§ 371 (c)(1),
(2), (4) Date: Dec. 2, 2010

(87) PCT Pub. No.: WO2009/147521
PCT Pub. Date: Dec. 10, 2009

(65) Prior Publication Data
US 2011/0120454 A1 May 26, 2011

(30) Foreign Application Priority Data
Jun. 3, 2008 (JP) ................. 2008-145741

(51) Int. Cl.
*C13K 1/02* (2006.01)

(52) U.S. Cl. ........................................ 127/37

(58) Field of Classification Search ........................ None
See application file for complete search history.

(56) References Cited

U.S. PATENT DOCUMENTS

| | | | |
|---|---|---|---|
| 2,959,500 A | 11/1960 | Schlapfer et al. | |
| 3,652,425 A | 3/1972 | Wilson | |
| 4,237,110 A | 12/1980 | Forster et al. | |
| 4,743,669 A | 5/1988 | Young | |
| 5,380,341 A | 1/1995 | Matthews et al. | |
| 7,947,656 B2* | 5/2011 | Yamasaki et al. | 514/23 |
| 2010/0126501 A1 | 5/2010 | Takeshima et al. | |
| 2010/0189706 A1* | 7/2010 | Chang et al. | 424/94.4 |

FOREIGN PATENT DOCUMENTS

| | | |
|---|---|---|
| DE | 713610 | 11/1941 |
| EP | 1 860 201 A1 | 11/2007 |
| JP | 56-30334 A | 3/1981 |
| JP | 59-124901 | 7/1984 |
| JP | 61-118420 | 6/1986 |
| JP | 3-93755 | 4/1991 |
| JP | 04-226940 A | 8/1992 |
| JP | 7-41462 | 2/1995 |
| JP | 7-215900 | 8/1995 |

(Continued)

OTHER PUBLICATIONS

Office Action for U.S. Appl. No. 12/597,176 mailed Mar. 10, 2011.

(Continued)

*Primary Examiner* — Melvin C Mayes
*Assistant Examiner* — Colette Nguyen
(74) *Attorney, Agent, or Firm* — Finnegan, Henderson, Farabow, Garrett & Dunner, LLP

(57) ABSTRACT

The invention relates to a method for hydrolyzing the plant fiber material to produce and separate a saccharide including glucose. The method includes a hydrolysis process of hydrolyzing cellulose contained in the plant fiber material and producing glucose in a first organic solvent having a cluster acid catalyst dissolved therein.

11 Claims, 4 Drawing Sheets

FOREIGN PATENT DOCUMENTS

| | | |
|---|---|---|
| JP | 8-299000 | 11/1996 |
| JP | 9-176206 | 7/1997 |
| JP | 10-137599 | 5/1998 |
| JP | 10-327900 | 12/1998 |
| JP | 11-240852 | 9/1999 |
| JP | 11-343301 | 12/1999 |
| JP | 2000-103758 A | 4/2000 |
| JP | 2002-59118 | 2/2002 |
| JP | 2002-85100 | 3/2002 |
| JP | 2004-241307 | 8/2004 |
| JP | 2004-256370 | 9/2004 |
| JP | 2006-129735 | 5/2006 |
| JP | 3802325 | 5/2006 |
| JP | 2006-149343 | 6/2006 |
| JP | 2006-206579 | 8/2006 |
| JP | 2007-104983 | 4/2007 |
| JP | 2008-271787 | 11/2008 |
| JP | 4240138 | 1/2009 |
| KR | 1996-0008643 | 6/1996 |
| WO | WO 95/26438 A1 | 10/1995 |
| WO | WO 2006/011479 A1 | 2/2006 |
| WO | WO 2007/026817 A1 | 3/2007 |
| WO | WO2008/132605 * | 6/2008 |
| WO | WO2008/132605 * | 11/2008 |
| WO | WO 2008/132605 A1 | 11/2008 |
| WO | WO 2009/031469 A1 | 3/2009 |

OTHER PUBLICATIONS

S. Takeshima et al., U.S. Appl. No. 12/674,427, "Method of Saccharification and Separation for Plant Fiber Materials," filed Feb. 20, 2010.
K. Arai et al., "Hydrolysis of Cellulose Fiber in the Presence of 12-Tungstosilicic Acid," Journal of Applied Polymer Science, vol. 30, No. 7, pp. 3051-3057 (Jul. 1985).
K. Arai et al., "Hydrolysis of Carbohydrates in the Presence of a Heteropolyacid," Makromol. Chem., Rapid Commun., vol. 4, pp. 181-185 (1983).
International Search Report in International Application No. PCT/IB2009/005920; Mailing Date: Aug. 24, 2009.
Written Opinion of the International Searching Authority in International Application No. PCT/IB2009/005920; Mailing Date: Aug. 24, 2009.
Notification of Reason(s) for Refusal in JP 2008-145741; Drafting Date: Jan. 7, 2010.
Notification of Reason(s) for Refusal in JP 2008-145737; Drafting Date: Jan. 7, 2010.
Decision of Refusal in Japanese Patent Appln. No. 2007-115407, dated May 17, 2011.
Notification of Reason(s) for Refusal in Japanese Patent Appln. No. 2007-115407, dated Aug. 23, 2011.
Makoto Misono, Unique acid catalysis of heteropoly compounds (heteropolyoxometalates) in the solid state, Chem. Commun., Jul. 7, 2001, No. 13 pp. 1141-1152.
Toru Nishimura, et al., High Catalytic Activities of Pseudoliquid Phase of Dodecatungstophosphoric Acid for Reactions of Polar Molecules, Chemistry Letters, 1991, pp. 1695-1698.
Makoto Misono, et al., Solid superacid catalysts, Chemtech, Nov. 1993, pp. 23-28.
Toko Kengaku, et al., Michael addition in the pseudoliquid phase of heteropoly compounds, Journal of molecular Catalysis A: Chemical 134, 1998, pp. 237-242.
Toshio Okuhara, et al., Catalysis by Heteropoly Compounds, Journal of Catalysis 93, 1985, pp. 224-230.
Office Action dated Jan. 9, 2012, for U.S. Appl. No. 12/597,176.
Reply to Office Action filed Jun. 9, 2011 in U.S. Appl. No. 12/597,176.
International Search Report in International Application No. PCT/IB2009/005927, Mailing Date: Aug. 25, 2009.
Written Opinion of the International Searching Authority in International Application No. PCT/IB2009/005927, Mailing Date: Aug. 25, 2009.
Notification of Reason(s) for Refusal in JP 2008-145732; Drafting Date: Jan. 7, 2010.
C. Yow et al., "Hydrolysis of Palm Olein Catalyzed by Solid Heteropolyacids," Journal of the American Oil Chemists' Society, vol. 79, No. 4, pp. 357-361 (2002).
Notification of Transmittal of the International Search Report and the Written Opinion of the International Searching Authority, or the Declaration, for PCT/IB2009/005928, dated Aug. 24, 2009.
G.-W. Wang et al., "Phosphotungstic Acid Catalyzed Amidation of Alcohols," Eur. J. Org. Chem., pp. 4367-4371 (2008).
Tong-hao, W. et al., "The Synthesis and Characterization of Molybdophosphoric Acid with Dawson Structure," 1991.
Kozhevnikov, I., "Catalysis by Heteropoly Acids and Multicomponent Polyoxometalates in Liquid-Phase Reactions," Chem. Rev., vol. 98, 1998, pp. 171-198.
Piao, D., et al., "An efficient partial oxidation of methane in trifluoracetic add using vanadium-containing heteropolyacid catalysts,", Journal of Organometallic Chemistry, vol. 574, 1999, pp. 116-120.
International Search Report for PCT/IB2008/001528, dated Oct. 9, 2008.
Office Action of Jan. 20, 2011 for U.S. Appl. No. 12/597,176.
Takeshima et al., U.S. Appl. No. 12/159,176, filed Oct. 23, 2009.
Takeshima et al., U.S. Appl. No. 12/995,756, filed Dec. 2, 2010.
Takeshima et al., U.S. Appl. No. 12/995,809, filed Dec. 2, 2010.
Makoto Misono, et al., Solid superacid catalysts, Chemtech, Nov. 1993, pp. 23-29.

* cited by examiner

XO$_4$ : REGULAR TETRAHEDRON (X = P, Si)

MO$_6$

OCTAHEDRON

● : METAL M = W, Mo
○ : OXYGEN

3. RECOVERY OF OCTANOL SOLUTION OF HETEROPOLY ACID

METHOD FOR GLYCOSYLATING AND SEPARATING PLANT FIBER MATERIAL

CROSS-REFERENCE TO RELATED APPLICATIONS

This application is a national phase application of International Application No. PCT/IB2009/005920, filed Jun. 2, 2009, and claims the priority of Japanese Application No. 2008-145741, filed Jun. 3, 2008, the contents of both of which are incorporated herein by reference.

BACKGROUND OF THE INVENTION

1. Field of the Invention

The invention relates to a method for producing a saccharide mainly including glucose, by glycosylating a plant fiber material and separating the obtained saccharide.

2. Description of the Related Art

It has been suggested to produce a saccharide mainly including glucose or xylose, from a plant material, which is a biomass, such as cellulose or hemicellulose by degrading squeezed sugarcane residues (bagasse) or wood chips and effectively use the produced saccharide as food or fuel, and this process has been put into practice. In particular, a technology by which a monosaccharide obtained by degrading plant fibers is fermented to produce an alcohol such as ethanol as fuel has attracted attention. A variety of methods have been heretofore suggested for producing a saccharide such as glucose by degrading cellulose or hemicellulose (for example, Japanese Patent Application Publication No. 8-299000 (JP-A-8-299000), Japanese Patent Application Publication No. 2006-149343 (JP-A-2006-149343), Japanese Patent Application Publication No. 2006-129735 (JP-A-2006-129735), and Japanese Patent Application Publication No. 2002-59118 (JP-A-2002-59118)), and a typical method includes hydrolyzing cellulose by using sulfuric acid such as dilute sulfuric acid or concentrated sulfuric acid or hydrochloric acid (JP-A-8-299000). A method in which cellulase enzyme is used (JP-A-2006-149343), a method in which a solid catalyst such as activated carbon or zeolite is used (JP-A-2006-129735), and a method in which pressurized hot water is used (JP-A-2002-59118) are also available.

However, a problem associated with the method by which cellulose is degraded by using an acid such as sulfuric acid is that the acid serving as a catalyst and the produced saccharide are difficult to separate from the hydrolysis reaction mixture obtained by hydrolysis. This is because glucose that is the main component of the cellulose hydrolysis product and the acid that serves as a hydrolysis catalyst are both soluble in water. Removal of the acid by neutralization or ion exchange from the hydrolysis reaction mixture is not only troublesome and costly, but it is also difficult to remove the acid completely and the acid often remains in the process of fermentation for ethanol. As a result, even when pH is optimized from the standpoint of activity of yeast in the process of fermentation for ethanol, concentration of salt increases, thereby reducing the yeast activity and decreasing the fermentation efficiency.

In particular, when concentrated sulfuric acid is used, the sulfuric acid is very difficult to remove to the extent such that yeast is not deactivated in the process of fermentation for ethanol and such a removal requires significant energy. By contrast, when dilute sulfuric acid is used, the sulfuric acid is relatively easy to remove. However, it is necessary to degrade cellulose under high temperature conditions, which is energy consuming. In addition the acid such as sulfuric acid and hydrochloric acid is very difficult to separate, collect, and reuse. Thus, the use of these acids as a catalyst for producing glucose is a cause of increased cost of bio-ethanol.

With the method in which pressurized hot water is used, it is difficult to adjust the conditions, and it is difficult to produce glucose with a stable yield. In addition, in this method, even glucose is degraded, thereby reducing the yield of glucose. Moreover, the activity of yeast is reduced by degraded components and fermentation may be inhibited. Another problem is associated with cost because the reactor (supercritical processing apparatus) is expensive and has poor durability.

SUMMARY OF THE INVENTION

The inventors have conducted a comprehensive study of glycosylation of cellulose and have discovered that a cluster acid in a pseudo-molten state has excellent catalytic activity with respect to cellulose hydrolysis and can be easily separated from the produced saccharide. Patent applications that cover the respective method have already been filed (Japanese Patent Application No. 2007-115407 and Japanese Patent Application No. 2007-230711). According to the present method, by contrast with the conventional method using concentrated sulfuric acid or dilute sulfuric acid, the hydrolysis catalyst can be recovered and reused and energy efficiency of the process leading to the recovery of aqueous saccharide solution and recovery of hydrolysis catalyst from cellulose hydrolysis can be increased. The inventors have further advanced the research of cellulose glycosylation using a cluster acid catalyst, discovered that hydrolysis of cellulose is possible in an organic solvent in which the cluster acid catalyst is dissolved, and successfully reduced the amount of cluster acid catalyst used. Thus, the invention provides a method for glycosylating and separating a plant fiber material that makes it possible to reduce the amount of cluster acid that is used as the cellulose hydrolysis catalyst.

The first aspect of the invention relates to a method for hydrolyzing the plant fiber material to produce and separate a saccharide including glucose. The method includes a hydrolysis process of hydrolyzing cellulose contained in the plant fiber material and producing glucose in a first organic solvent in which the cluster acid catalyst is dissolved. With the method, by using an organic solvent that can dissolve a cluster acid catalyst as a reaction solvent of cellulose hydrolysis, it is possible to reduce the amount of the cluster acid catalyst used. Where the aforementioned cluster acid catalyst in a pseudo-molten state is used, the cluster acid catalyst in the pseudo-molten state can be also caused to function as a reaction solvent. Therefore, the amount of cluster acid catalyst used is high. As a result, the production cost of saccharide is increased unless the recovery ratio of the cluster acids is sufficiently increased. By contrast, in accordance with the invention, by using an organic solvent as a reaction solvent, it is possible to stir and mix the plant fiber material and the cluster acid catalyst sufficiently and ensure good contact therebetween even with a small amount of the cluster acid catalyst. Therefore, the amount of the cluster acid catalyst used can be reduced, while maintaining the cellulose glycosylation reactivity.

By using as the first organic solvent a high-boiling polar organic solvent that has a boiling point higher than a reaction temperature in the hydrolysis process and hardly dissolves the saccharide, it is possible to inhibit the evaporation of the first organic solvent in the hydrolysis process and separate and recover the produced saccharide and cluster acid with good efficiency from the hydrolysis reaction mixture.

From the standpoint of glycosylation reactivity of cellulose in the hydrolysis process, it is preferred that a solubility of the cluster acid catalyst in the first organic solvent be equal to or greater than 50 g/100 ml. Furthermore, in order to inhibit sufficiently the evaporation of the first organic solvent in the hydrolysis process, it is preferred that the boiling point of the first organic solvent be equal to or higher than 90° C. In order to separate and recover the saccharide and cluster acid catalyst with good efficiency from the hydrolysis reaction mixture obtained in the hydrolysis process, it is preferred that a solubility of the saccharide in the first organic solvent be equal to or less than 1.0 g/100 ml.

In accordance with the invention, the hydrolysis process can be performed under comparatively mild reaction conditions of a pressure from a normal pressure to 1 MPa and a temperature of equal of or lower than 140° C. and excels in energy efficiency. A heteropoly acid is a representative cluster acid catalyst.

The reaction mixture after the hydrolysis process (can be referred to hereinbelow as "hydrolysis reaction mixture") can be solid-liquid separated into a liquid fraction including the cluster acid catalyst and the first organic solvent and a solid fraction including the saccharide (saccharide separation process). In another possible process, a second organic solvent, which is compatible with the first organic solvent and has an ability to dissolve the cluster acid catalyst that is higher than that of the first organic solvent and a boiling point that is lower than that of the first organic solvent, is added to the reaction mixture after the hydrolysis process and solid-liquid separation is performed into a liquid fraction including the cluster acid catalyst, the first organic solvent, and the second organic solvent and a solid fraction including the saccharide. In this case, the separation and recovery of the cluster acid catalyst can be performed more efficiently. The second organic solvent and an organic solvent solution including a cluster acid that is produced by dissolution of the cluster acid catalyst in the first organic solvent can be separated by distillation of the liquid fraction.

In accordance with the invention, by using an organic solvent that can dissolve a cluster acid catalyst as a reaction solvent for hydrolyzing a plant fiber material, it is possible to reduce the amount of the cluster acid catalyst used and reduce the production cost of saccharide, while maintaining the glycosylation reactivity of cellulose.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF EMBODIMENTS

Figure 1:
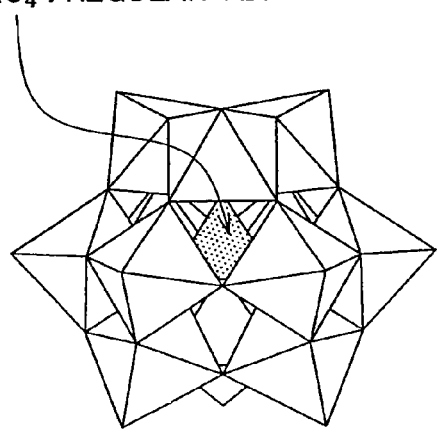
FIG. 1 shows a Keggin structure of a heteropoly acid.
Figure 1:
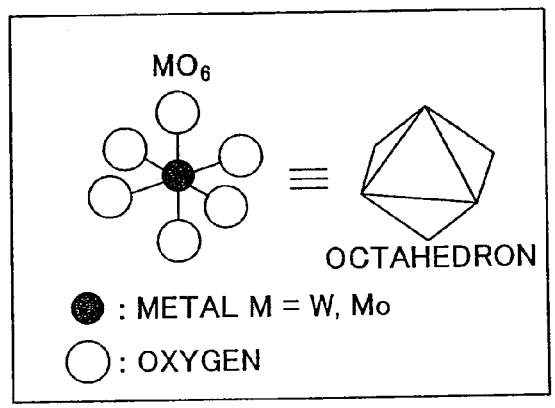

An embodiment of the invention relates to a method for hydrolyzing a plant fiber material to produce and separate a saccharide mainly including glucose. The method includes a hydrolysis process of hydrolyzing cellulose contained in the plant fiber material and producing glucose in a first organic solvent having a cluster acid catalyst dissolved therein.

In the aforementioned patent applications (Japanese Patent Application No. 2007-115407 and Japanese Patent Application No. 2007-230711), the inventors heated a cluster acid to obtain a pseudo-molten state thereof and used the cluster acid as a cellulose hydrolysis catalyst and also as a reaction catalyst in hydrolysis. As a result, the amount of the cluster acid catalyst used in the process disclosed in these patent applications is comparatively large. Therefore, the recovery ratio of cluster acid catalyst has to be sufficiently increased in order to ensure the reusable amount of the cluster acid catalyst separated from saccharide and recovered.

The inventors have further conducted a comprehensive study and found that an organic solvent that can dissolve the cluster acid catalyst can be used as a reaction solvent in hydrolysis of a plant fiber material. It was also found that where the organic solvent is used as a hydrolysis reaction solvent, miscibility and contact ability of the cluster acid catalyst and plant fiber material are high and, therefore, the amount of the cluster acid catalyst used can be reduced, while maintaining the glycosylation reactivity of the cellulose contained in the plant fiber material. By reducing the amount of cluster acid catalyst used per unit weight of saccharide, it is possible to reduce the production cost of the saccharide. In particular, by separating the cluster acid catalyst from the produced saccharide and recovering the cluster acid catalyst after the hydrolysis process, it is possible to use the cluster acid catalyst again as a hydrolysis catalyst for the plant fiber material. As a result, the amount of the cluster acid catalyst used is reduced and the recovery ratio thereof is increased, thereby making it possible to ensure the reusable amount of the cluster acid catalyst and further reduce the production cost.

Further, where the cluster acid catalyst is heated and used in a pseudo-molten state, as described in the aforementioned patent applications, a problem occurring when the cluster acid catalyst makes a transition from the pseudo-molten state to a solid state due to decrease in temperature is that miscibility and contact ability of the cluster acid catalyst and plant fiber material decrease and glycosylation reactivity is reduced. Therefore, the reaction system temperature has to be strictly controlled to maintain the pseudo-molten state of the cluster acid catalyst. In addition, a limitation is placed on the order in which the materials are charged into the reactor. As a result, the degree of freedom in designing the reactor is decreased. By contrast, in accordance with the invention, the organic solvent that can dissolve the cluster acid catalyst serves as a reaction catalyst for hydrolysis, and contact ability and stirring ability of the cluster acid catalyst and plant fiber material in the hydrolysis process are thereby ensured. Therefore, the temperature control of the reaction system is facilitated, the order in which the materials are charged into the reactor is not particularly limited, and the degree of freedom in designing the reactor is high.

A embodiment of the invention will be described in detail hereinbelow. First, a hydrolysis process will be described in which cellulose contained in the plant fiber material is hydrolyzed and a saccharide mainly including glucose is produced (see FIG. 2). In the explanation below, the attention is focused on the process in which glucose is mainly produced from cellulose, but a process in which hemicellulose is included in addition to cellulose in the plant fiber material and a process in which the product includes other monosaccharides such as xylose in addition to glucose also fall within the scope of the invention. The plant fiber material is not particularly limited, provided that it includes cellulose or hemicellulose, and examples thereof include cellulose-based biomass, such as broad-leaved trees, bamboos, coniferous trees, kenaf, scrap wood from furniture, rice straws, wheat straws, rice husks, and squeezed sugarcane residues (bagasse). The plant fiber material may be the cellulose or hemicellulose that is separated from the biomass, or may be the cellulose or hemicellulose that is artificially synthesized.

Such fiber materials are usually used in the pulverized form to improve dispersivity in the reaction system. The method for pulverizing may be a commonly used method. From the standpoint of facilitating mixing with the cluster acid catalyst and reaction, it is preferred that the fiber material be pulverized to a powder with a diameter of about a few microns to 200 μm.

Furthermore, lignin contained in the fiber material may be dissolved, if necessary, by performing a pulping treatment in advance. By dissolving and removing the lignin, it is possible to increase the probability of contact between the cluster acid catalyst and cellulose in the hydrolysis process and, at the same time, reduce the amount of residue contained in the hydrolysis reaction mixture and inhibit the decrease in the saccharide yield or cluster acid recovery ratio caused by admixing of the produced saccharide or cluster acid to the residue. In a case where the pulping treatment is performed, the degree of grinding of the plant fiber material can be comparatively small (coarse grinding). The resultant effect is that labor, cost, and energy required for pulverizing the fiber material can be reduced. The pulping treatment can be performed, for example, by bringing the plant fiber material (for example, from several centimeters to several millimeters) into contact with an alkali or a salt such as NaOH, KOH, $Ca(OH)_2$, $Na_2SO_3$, $NaHCO_3$, $NaHSO_3$, $Mg(HSO_3)_2$, $Ca(HSO_3)_2$, an aqueous solution thereof, a mixture thereof with a $SO_2$ solution, or a gas such as $NH_3$ under steam. Specific conditions include a reaction temperature of 120 to 160° C. and a reaction time of several tens of minutes to about 1 h.

In accordance with the invention, the cluster acid used as a catalyst for hydrolyzing the plant fiber material means an acid in which a plurality of oxoacids are condensed, that is, a so-called polyacid. In most polyacids, it is known that in polyacids, a plurality of oxygen atoms are bounded to a central element, and as a result the polyacids are oxidized to the extent that the oxidation umber becomes maximum, and the polyacids demonstrate excellent properties as an oxidation catalyst, and the polyacids are strong acids. For example, the acid strength of phosphotungstic acid (pKa=−13.16), which is a heteropoly acid, is higher than the acid strength of sulfuric acid (pKa=−11.93). Thus, even under mild temperature conditions, such as a temperature of 50° C., for example, it is possible to degrade cellulose or hemicellulose to produce a monosaccharide, such as glucose or xylose.

The cluster acid used in the invention may be either a homopoly acid or a heteropoly acid, but a heteropoly acid is preferred because it has a high oxidizing power and a high acid strength. The heteropoly acid that can be used is not particularly limited. For example, the heteropoly acid can be represented by the general formula HwAxByOz (A stands for a heteroatom, B stands for a polyatom that serves as a polyacid skeleton, w stands for a composition ratio of hydrogen atoms, x stands for a composition ratio of heteroatoms, y stands for a composition ratio of polyatoms, and z stands for a composition ratio of oxygen atoms). Examples of the polyatom B include atoms such as W, Mo, V, and Nb that can form the polyacid. Examples of the heteroatom A include atoms such as P, Si, Ge, As, and B that can form a heteropoly acid. The number of kinds of the polyatoms and heteroatoms that are contained in a single molecule of the heteropoly acid may be one or more.

Because of good balance of acid strength and the oxidizing power, it is preferred that phosphotungstic acid $H_3[PW_{12}O_{40}]$ or silicotungstic acid $H_4[SiW_{12}O_{40}]$, which are tungstates, be used. Phosphomolybdic acid $H_3[PMo_{12}O_{40}]$, which is a molybdate, also can be advantageously used.

The structure of a Keggin-type $[X^{n+}M_{12}O_{40}: X=P, Si, Ge, As,$ etc., M=Mo, W, etc.] heteropoly acid (phosphotungstic acid) is shown in FIG. 1. A tetrahedron $XO_4$ is present at the center of a polyhedron constituted by octahedron $MO_6$ units, and a large amount water of crystallization is present around this structure. The structure of the cluster acid is not particularly limited and can be not only of the Keggin type, but also, for example, of a Dawson type. Here, water that is coordinated to the cluster acid catalyst at a constant amount ratio is described by a generally used term "water of crystallization". Thus, water of crystallization typically indicates water contained in the crystals when the cluster acid is in a crystalline state, but in the present description, the term "water of crystallization" includes not only the water contained in the crystals of the cluster acid catalyst, but also water molecules that are coordinated to the cluster acid catalyst in a state in which the cluster acid catalyst is dissolved and liberated as a single molecule.

Because no component of cluster acid catalyst is thermally decomposed and volatilized even at a high temperature such as 800° C., the amount of water of crystallization can be specified by a pyrolytic method (TG measurements). The amount of water of crystallization varies depending on the environment. Therefore, in the present description, the amount of water of crystallization is represented by a ratio of water of crystallization (%) that is a value obtained under the assumption that a standard amount of water of crystallization in the cluster acid is 100%. The standard amount of water of crystallization as referred to herein is the amount (the number of molecules) of water of crystallization contained in one molecule of the cluster acid in a solid state at room temperature, and the standard amount varies depending on the kind of cluster acid. For example, the standard amount of water of crystallization is about 30 in phosphotungstic acid ($H_3[PW_{12}O_{40}].nH_2O$ (n≈30)), about 24 in silicotungstic acid ($H_4[SiW_{12}O_{40}].nH_2O$ (n≈24)), and about 30 in phosphomolybdic acid ($H_3[PMo_{12}O_{40}].nH_2O$ (n≈30)).

The cluster acid as described hereinabove has catalytic activity with respect to a hydrolysis reaction of cellulose or hemicellulose. Furthermore, because of a high acid strength thereof, the cluster acid also shows high catalytic activity with respect to the hydrolysis reaction of cellulose even at a low temperature. Because the diameter of a molecule of the cluster acid is about 1 to 2 nm, typically slightly larger than 1 nm, the cluster acid is easily mixed with the plant fiber material, which is the raw material, has high contact ability with the plant fiber material, and efficiently promotes hydrolysis of cellulose. Thus, it is possible to hydrolyze cellulose under mild temperature conditions with high energy efficiency and low environmental load. In addition, because the state of the cluster acid becomes a solid state at a certain temperature, with the method in accordance with the invention that uses a cluster acid as a catalyst, by contrast with the conventional method for hydrolysis of cellulose that uses an acid such as sulfuric acid, the saccharide, which is the product, and the catalyst can be easily separated. Therefore, the cluster acid that has been separated from the produced saccharide can be recovered and reused. In addition, because a saccharide with a high purity can be obtained, the yeast activity decrease in the saccharide fermentation process can be inhibited.

An important specific feature of the invention is that the first organic solvent that can dissolve the cluster acid catalyst is used as a reaction catalyst in the hydrolysis reaction of the plant fiber material, and the cellulose contained in the plant fiber material is hydrolyzed in the first organic solvent in which the cluster acid catalyst has been dissolved. Because the cluster acid catalyst has high affinity for both the water and the first organic solvent, the cluster acid catalyst can be present on the interface of an aqueous phase and an organic phase including the first organic solvent. Therefore, the cluster acid catalyst reacts with the plant fiber material that is insoluble in the first organic solvent, produces a saccharide, and can be separated from the saccharide that is insoluble or has poor solubility in the first organic solvent. The first organic solvent that dissolves the cluster acid catalyst may dissolve the cluster acid catalyst at least at the reaction temperature of hydrolysis, but usually a first organic solvent is used that can dissolve the cluster acid catalyst at a temperature equal to or lower than the reaction temperature of hydrolysis, typically at room temperature. More specifically, it is preferred that the solubility of the cluster acid catalyst be equal to or higher than 50 g/100 ml, more preferably equal to or higher than 100 g/100 ml, and even more preferably equal to or higher than 500 g/100 ml.

From the standpoint of inhibiting the evaporation of the first organic solvent in the hydrolysis process, it is preferred that the boiling point of the first organic solvent be higher than the reaction temperature in the hydrolysis process. More specifically, it is preferred that the boiling point of the first organic solvent be equal to or higher than 90° C., more preferably equal to or higher than 125° C., and even more preferably equal to or higher than 150° C.

In order to increase the separation efficiency of saccharide in the saccharide separation process that follows the hydrolysis process, it is preferred that a saccharide such as glucose be hardly soluble in the first organic solvent. Where the saccharide is hardly soluble in the first organic solvent, the produced saccharide precipitates in the first organic solvent in the hydrolysis process. Therefore, a liquid fraction including the cluster acid catalyst and the first organic solvent and a solid fraction including the saccharide can be separated by solid-liquid separation, e.g. by filtration, of the reaction hydrolysis mixture obtained after the hydrolysis process (the mixture contains the produced saccharide, cluster acid catalyst, first organic solvent, and sometimes a residue). The organic solvent in which saccharides are hardly soluble as referred to herein is an organic solvent such that the solubility of saccharide in the organic solvent is equal to or less than 1 g/100 ml, preferably equal to or less than 0.2 g/100 ml, more preferably equal to or less than 0.1 g/100 ml. It is most preferred that the saccharide be insoluble in the first organic solvent (solubility is 0 g/100 ml).

Examples of such organic solvents that can dissolve the cluster acid catalyst and hardly dissolve saccharides include polar organic solvents, more specifically, polar organic solvents with a specific dielectric constant of equal to or higher than 8, more specifically polar organic solvents with a specific dielectric constant of 8 to 18. From this standpoint, the preferred first organic solvent is a high-boiling polar organic solvent that has a boiling point higher than the reaction temperature in the hydrolysis process and hardly dissolves saccharides. More specifically, a high-boiling polar organic solvent with a boiling point of equal to or higher than 90° C. and a specific dielectric constant of 8 to 18 is preferred.

In accordance with the invention, the preferred first organic solvent is not particularly limited, provided that the first organic solvent has the above-described properties. Specific examples include alcohols (may have a straight chain or a branched structure) that have 6 to 10 carbon atoms in a molecule. Among them, from standpoint of flammability, alcohols that have 8 to 10 carbon atoms in a molecule are preferred. Specific examples of suitable alcohols include 1-hexanol, 1-heptanol, 2-heptanol, 1-octanol, 2-octanol, 1-decanol, and 1-nonanol are preferred. Among them, 1-octanol, 2-octanol, 1-decanol, and 1-nonanol are preferred, and 1-octanol and 2-octanol are even more preferred.

The amount of the first organic solvent used in the hydrolysis process is not particularly limited and may be appropriately selected. A period for charging materials such as the cluster acid catalyst, first organic solvent, and plant fiber material in the hydrolysis process is not particularly limited, but it is preferred that the cluster acid catalyst be dissolved in advance in the first organic solvent to prepare an organic solvent solution of the cluster acid catalyst. It is also preferred that the organic solvent solution of the cluster acid catalyst be heated in advance to the hydrolysis reaction temperature, the plant fiber material be charged into the heated organic solvent solution of the cluster acid catalyst, and hydrolysis process be conducted.

Water for hydrolyzing the cellulose is necessary in the hydrolysis process. More specifically, (n−1) water molecules are necessary to decompose cellulose obtained by polymerization of (n) glucoses into (n) glucoses (n is a natural number). Therefore, at least water necessary to hydrolyze the entire cellulose contained in the plant fiber material to glucose is added to the reaction system. It is preferred that the minimum amount of water necessary to hydrolyze the entire amount of cellulose charged as the plant fiber material to glucose be added. This is because where the excess water is added, the produced saccharide is dissolved in the excess water, an aqueous solution of saccharide is obtained, and the process of separating this aqueous solution of saccharide and the first organic solvent in which the cluster acid catalyst has been dissolved becomes complex. A period for adding the water is not particularly limited. For example, the water may be added to the organic solvent solution of the cluster acid catalyst before heating or after heating, or the organic solvent solution of the cluster acids may be added together with the plant fiber material. It is preferred that the amount of water necessary to hydrolyze glucose be ensured even if the relative humidity of the reaction system is decreased by heating in the hydrolysis process. More specifically, a method can be used by which a saturated vapor pressure state is created at a hydrolysis reaction temperature, for example, inside a reaction container that has been sealed in advance, to bring the atmosphere of the reaction system under a saturated vapor pressure at a predetermined reaction temperature, and the temperature is lowered, while maintaining the sealed state, to cause condensation of the vapor.

The preferred ratio of the plant fiber material and cluster acid catalyst in the hydrolysis process differs depending on the state of the plant fiber material used (for example, size and type of fiber material), stirring method in the hydrolysis process, and the amount of first organic solvent used. Therefore, this ratio may be appropriately determined correspondingly to the implementation conditions of the hydrolysis process. For example, although depending on the pretreatment of the plant fiber material, a specific ratio (weight ratio) of the cluster acid catalyst to the plant fiber material is preferably within a range of 0.5:1 to 2:1, more particularly this ratio can also be 0.5:1 to 1:1, and the weight ratio of the cluster acid catalyst can be reduced to about ⅓ to ⅙ that of the conventional process that uses a cluster acid catalyst in a pseudo-molten state. The stirring method in the hydrolysis process is not particularly limited. For example, stirring in a ball mill under heating is an advantageous method. Other typical stirring devices can be also used.

Temperature conditions in the hydrolysis process may be appropriately determined by taking into account several factors (for example, reaction selectivity, energy efficiency, cellulose reaction ratio, and the like), but from the standpoint of balance of energy efficiency, cellulose reaction ratio, and glucose yield, a temperature of equal to or lower than 140° C. is usually preferred, and a temperature of equal to or lower than 120° C. is particularly preferred. Depending on the form of plant fiber material, the hydrolysis process can be also performed at a low temperature of equal to or lower than 100° C., and in this case, glucose can be produced with an especially high energy efficiency.

Selectivity of glucose production in the hydrolysis of cellulose contained in the plant fiber material varies depending on the hydrolysis process. The reaction efficiency generally rises as the reaction temperature rises. For example, as described in Japanese Patent Application No. 2007-115407, in the hydrolysis reaction of cellulose using phosphotungstic acid with a ratio of water of crystallization of 160%, the reaction ratio R at a temperature of 50 to 90° C. rises with the increase in temperature and almost the entire cellulose reacts at about 80° C. The glucose yield shows a similar trend to the cellulose reaction rate and increases at 50 to 60° C., but reaches a peak at 70° C. and then decreases. Thus, glucose is produced with high selectivity at 50 to 60° C., but at 70 to 90° C., reactions other than glucose production also proceed, such as production of other saccharides such as xylose and formation of decomposition products.

Therefore, the reaction temperature of hydrolysis is an important factor that governs the selectivity of cellulose reaction ratio and selectivity of glucose production, and it is preferable that the hydrolysis reaction temperature be low in view of energy efficiency. However, it is preferred that the temperature of hydrolysis reaction be determined by taking into account also the cellulose reaction ratio and glucose production selectivity. The duration of hydrolysis process is not particularly limited and may be appropriately set according to the shape of the plant fiber material used, ratio of the plant fiber material and cluster acid catalyst, catalytic capacity of the cluster acid catalyst, reaction temperature, and reaction pressure.

The pressure in the hydrolysis process is not particularly limited, but because the catalytic activity of the cluster acid catalyst with respect to the cellulose hydrolysis reaction is high, the cellulose hydrolysis can be advanced with good efficiency even under mild pressure conditions such as a range from a normal pressure (atmospheric pressure) to 1 MPa. The hydrolysis reaction time may also be appropriately set.

Where the temperature of reaction system decreases after the end of hydrolysis is decreased, the saccharide produced in the hydrolysis process becomes an aqueous saccharide solution when water, which dissolved the saccharide, is present in the hydrolysis reaction mixture, and where no water is present, the saccharide precipitates and is contained in the solid state. Part of the produced saccharide can be present in the form of aqueous solution and the balance can be contained in the form of the hydrolysis reaction mixture in the solid state. Because the cluster acid catalyst is also soluble in water, where a sufficient amount of water is contained in the hydrolysis reaction mixture, the cluster acid catalyst is also dissolved in water.

A process of separating the produced saccharide (mainly, glucose) and the cluster acid catalyst from the hydrolysis reaction mixture after the hydrolysis process will be described below (see FIG. 3). First, the produced saccharide is precipitated in the hydrolysis reaction mixture by using an organic solvent that hardly dissolves the saccharide as the first organic solvent. Because the cluster acid catalyst has been dissolved in the first organic solvent, a solid fraction including the produced saccharide and a liquid fraction including the cluster acid catalyst and the first organic solvent can be separated by performing solid-liquid separation of the hydrolysis reaction mixture. With certain types of the plant fiber material used, the solid fraction including the produced saccharide can also include a residue. A method for separating the hydrolysis reaction mixture into the solid fraction and liquid fraction is not particularly limited, and a typical solid-liquid separation method such as decantation and filtration can be used.

Where water, such as distilled water, is added to the solid fraction obtained by solid-liquid separation and stirring is performed, the saccharide is dissolved in the water. Therefore, the aqueous saccharide solution and the solid fraction including the residue can be separated by further performing solid-liquid separation. The liquid fraction obtained by solid-liquid separation can be used again in the form of an organic solvent solution in which the cluster acid catalyst is dissolved in the first organic solvent as the reaction solvent and catalyst of hydrolysis of the plant fiber material.

In the saccharide separation process, a second organic solvent that is compatible with the first organic solvent and has ability to dissolve the cluster acid catalyst that is higher and a boiling point that is lower than those of the first organic solvent is added to the hydrolysis reaction mixture, and solid-liquid separation of a liquid fraction including the cluster acid catalyst, first organic solvent, and second organic solvent and a solid fraction including the saccharide is performed by stirring and filtration or the like. As a result, the recovery ratio of the cluster acid catalyst can be increased and purity of the saccharide obtained can be raised. First, the second organic solvent that is compatible with the first organic solvent and has ability to dissolve the cluster acid catalyst that is higher than that of the first organic solvent is added, thereby making it possible to dissolve a larger amount of the cluster acid catalyst in an organic phase (liquid phase) including the first organic solvent and second organic solvent. As a result, the recovery ratio of the cluster acid catalyst and purity of the saccharide can be increased. Furthermore, because the boiling point of the second organic solvent is lower than that of the first organic solvent, the second organic solvent and an organic solvent solution in which the cluster acid catalyst is dissolved in the first organic solvent can be separated by distilling off a liquid fraction including the cluster acid catalyst and the organic solvent (first organic solvent and second organic solvent) that has been separated and recovered from the hydrolysis reaction mixture. In this case, a typical method such as vacuum distillation and freeze vacuum drying can be used as the distillation method. Among them, vacuum distillation performed at a temperature of equal to or lower than 50° C. is preferred.

The second organic solvent is not particularly limited, but ethanol is especially preferred as the second organic solvent. Ethanol has extremely high ability to dissolve heteropoly acids that are typical cluster acid catalysts and demonstrates strong effects of increasing the recovery ratio of the heteropoly acid and increasing the purity of saccharide. In addition to ethanol, other solvents, for example, alcohols such as methanol and n-propanol and ethers such as diethyl ether and diisopropyl ether can be used as the second organic solvent.

Figure 3:
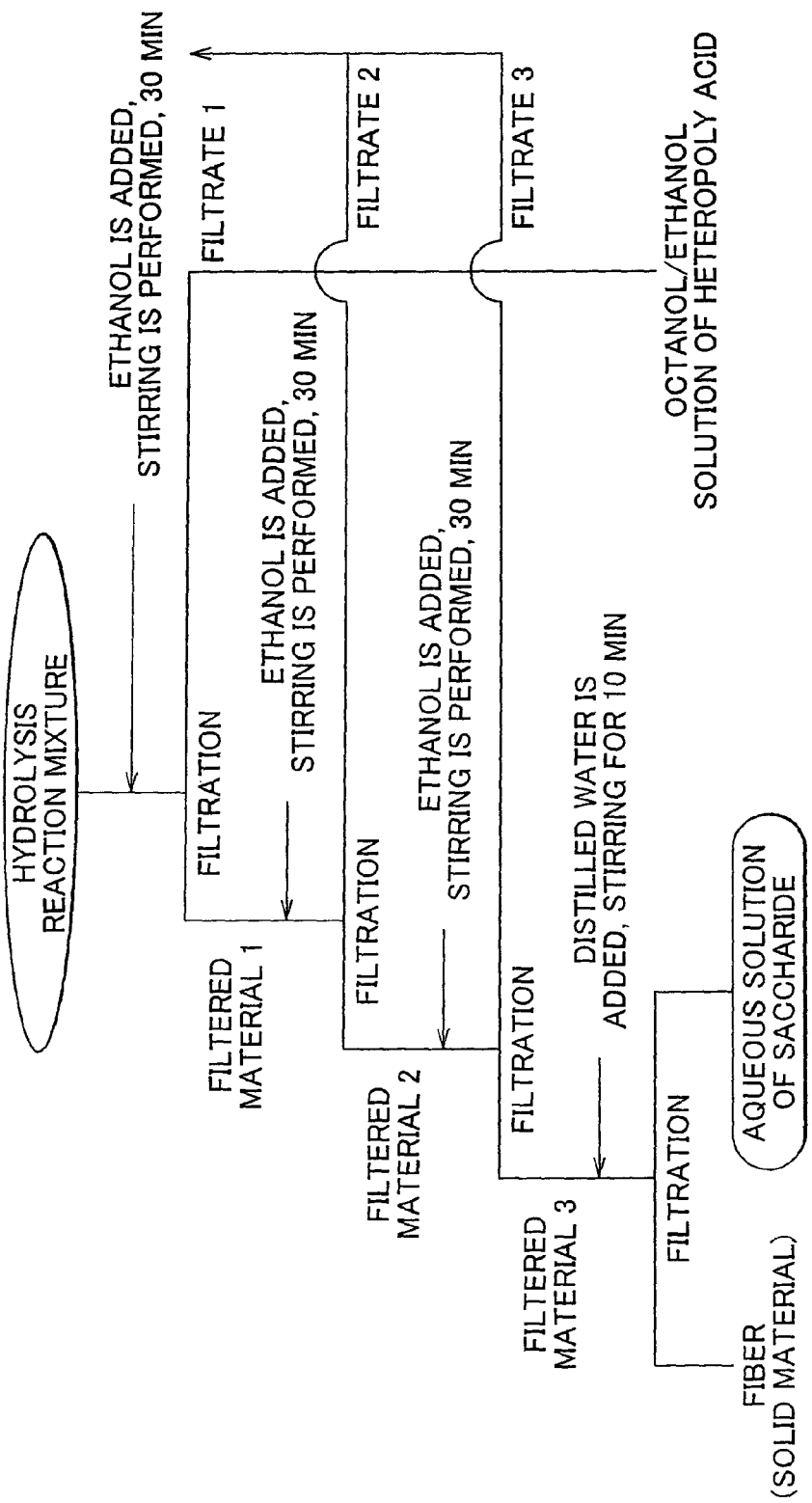
FIG. 3 shows a procedure of the saccharide separation process in the examples.
Figure 4:
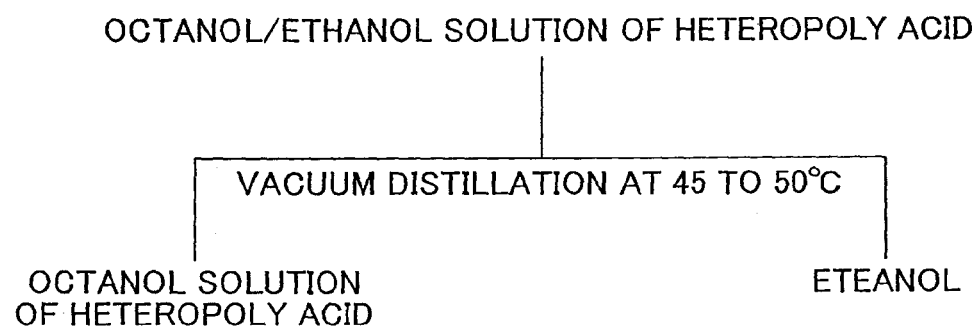
FIG. 4 shows a procedure of heteropoly acid recovery in the examples.

It is preferred that that the solid fraction obtained by solid-liquid separation of the hydrolysis reaction mixture in which the second organic solvent is added thereto be separated into the second organic solvent having dissolved therein the cluster acid catalyst contained in the solid fraction and the solid fraction including the saccharide by adding again the second organic solvent to the solid fraction obtained by solid-liquid separation of the hydrolysis reaction mixture, mixing, washing the solid fraction, and performing solid-liquid separation (see FIG. 3). If necessary, the solid fraction can be washed with the second organic solvent a plurality of times. The recovered second organic solvent including the cluster acid catalyst dissolved therein can be again added to and mixed with the hydrolysis reaction mixture and used for washing the mixture (see FIG. 3). The amount of the second organic solvent added to the mixture is not particularly limited, provided that this amount can dissolve the cluster acid catalyst used in the hydrolysis process and can be recovered.

Depending on the amount of water in the hydrolysis process and the type of the first organic solvent, an aqueous solution including the saccharide or cluster acid dissolved therein and/or an organic solvent solution including the saccharide dissolved therein can be contained in the hydrolysis reaction mixture. In such a case, for example, it is possible to heat the hydrolysis reaction mixture, remove water, thereby precipitating the saccharide, then perform solid-liquid separation to separate the solid fraction including the saccharide and the organic solvent including the cluster acid catalyst dissolved therein, or heat the hydrolysis reaction mixture, remove the organic solvent, then add a solvent that can dissolve the cluster acid catalyst, but can hardly dissolve the saccharide, selectively dissolve the cluster acid catalyst in the solvent, and perform separation into the cluster acid catalyst solution and a solid fraction including the saccharide. It is especially preferred that the amount of water in the hydrolysis reaction mixture be adjusted so that the ratio of water of crystallization in the entire cluster acid catalyst contained in the hydrolysis reaction mixture be less than 100%. This is done to prevent the saccharide, which is a product, from dissolving in the excess water in a case where the cluster acid catalyst has a large amount of water of crystallization, typically the amount of water of crystallization that is equal to or higher than the standard amount of water of crystallization and to increase the saccharide recovery ratio.

A method that can decrease the amount of moisture in the hydrolysis reaction mixture may be used for reducing the ratio of water of crystallization in the cluster acid catalyst contained in the hydrolysis reaction mixture. Examples of such a method include a method by which the sealed state of the reaction system is released and heating is performed to evaporate the moisture contained in the hydrolysis mixture and a method by which a desiccating agent or the like is added to the hydrolysis mixture and moisture contained in the hydrolysis mixture is removed.

Quantitative determination of D-(+)-glucose and D-(+)-xylose was conducted by high-performance liquid chromatography (HPLC) post-label fluorescence detection method. The identification and quantitative determination of the cluster acid was performed by inductively coupled plasma (ICP).

EXAMPLE 1

Figure 2:
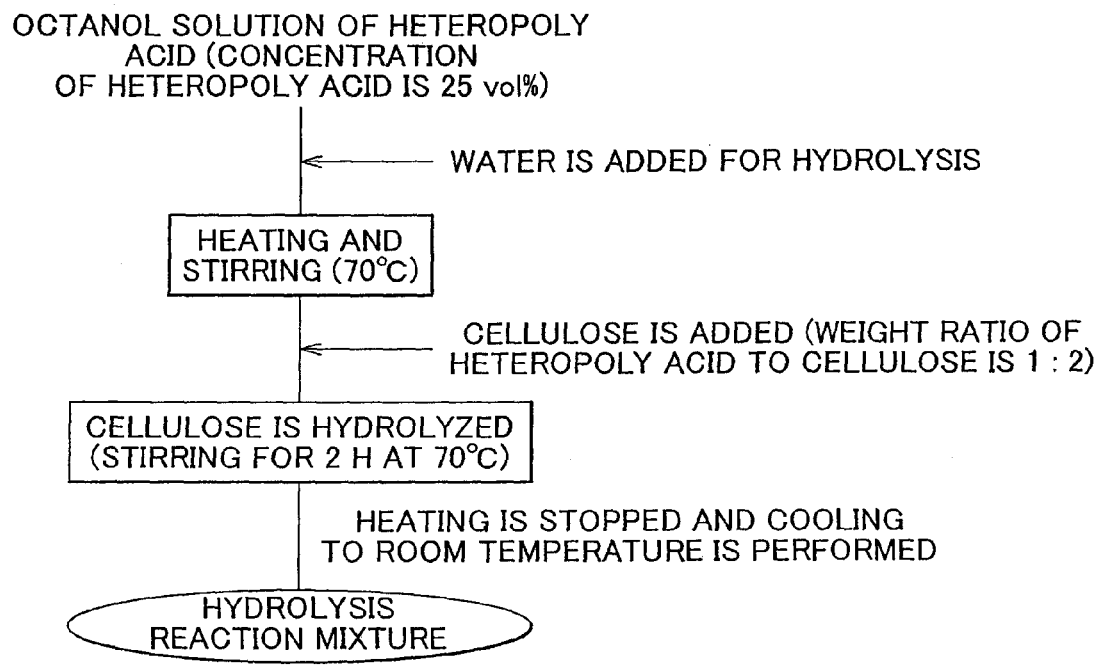
FIG. 2 shows a procedure of the hydrolysis process in the examples.

A heteropoly acid octanol solution was prepared in advance in which a heteropoly acid (phoshotungstic acid) was dissolved in octanol (concentration of heteropoly acid: 25 vol. %). Distilled water was placed in advance in a sealed container, the temperature was raised to a predetermined reaction temperature (70° C.), a saturated vapor pressure state was obtained inside the container, and water vapor was caused to adhere to the inner surface of the container. Then, the heteropoly acid octanol solution including 250 g of heteropoly acid and the amount of water (55.6 g) necessary to hydrolyze cellulose and obtain glucose were charged into the container and stirred under heating, as shown in FIG. 2. Once the temperature inside the container reached 70° C., stirring was further continued for 5 min. Then, 0.5 kg of cellulose was charged (weight ratio of heteropoly acid to cellulose was 1:2), the temperature was raised to 70° C. under stirring, and then stirring was continued for 2 h at a temperature of 70° C. The heating was then stopped, the container was opened, and the hydrolysis reaction mixture was cooled to room temperature, while discharging extra water vapor.

A total of 500 ml of ethanol was then added to the hydrolysis reaction mixture located inside the container and stirring was conducted for 30 min, followed by filtration that yielded a filtrate 1 and a filtered material 1, as shown in FIG. 3. The filtrate 1 (octanol/ethanol solution of heteropoly acid) was recovered. A total of 500 ml of ethanol was further added to the filtered material 1 and stirring was conducted for 30 min, followed by filtration that yielded a filtrate 2 and a filtered material 2. A total of 500 ml of ethanol was added to the filtered material 2 and stirring was conducted for 30 min, followed by filtration that yielded a filtrate 3 and a filtered material 3. The obtained filtrates 2 and 3 were recovered together with the filtrate 1. Distilled water was added to the obtained filtered material 3 and stirring was conducted for 10 min. No residue could be confirmed to be present in the obtained aqueous solution, but the solution was still filtered and an aqueous saccharide solution was obtained. The yield of monosaccharides (a sum total of glucose, xylose, arabinose, mannose, and galactose) was calculated from the obtained aqueous saccharide solution. The result was 72.5%. The filtrates 1 to 3 recovered in the above-described manner were subjected to vacuum distillation at 45 to 50° C., ethanol was evaporated, the heteropoly acid octanol solution and ethanol were separated, and the heteropoly acid octanol solution was recovered. The recovery ratio of the heteropoly acid was 99.2%. The yield of monosaccharides and the recovery ratio of the heteropoly acid were calculated in the following manner.

Yield of monosaccharides (%): a ratio (weight ratio) of a sum total of actually recovered monosaccharides to a theoretic amount of produced monosaccharides that are produced when the entire amount of charged cellulose is converted into monosaccharides.

Recovery ratio of heteropoly acid (%): a ratio of recovered heteropoly acid to charged heteropoly acid.

EXAMPLE 2

A heteropoly acid octanol solution was prepared in advance in which a heteropoly acid (phosphotungstic acid) was dissolved in octanol (concentration of heteropoly acid: 25 vol. %). Distilled water was placed in advance in a sealed container, the temperature was raised to a predetermined reaction temperature (70° C.), a saturated vapor pressure state was obtained inside the container, and water vapor was caused to adhere to the inner surface of the container. Then, 0.5 kg of cellulose was charged into the container. The heteropoly acid octanol solution including 250 g of heteropoly acid (weight ratio of heteropoly acid to cellulose was 1:2), and the amount of water (55.6 g) necessary to hydrolyze cellulose and obtain glucose were charged into the container, the temperature was raised to 70° C. under stirring, and then stirring was continued for 2 h at a temperature of 70° C. The heating was then stopped, the container was opened, and the hydrolysis reaction mixture was cooled to room temperature, while discharging extra water vapor. The aqueous saccharide solution and heteropoly acid octanol solution were then recovered in the same manner as in Example 1. The yield of monosaccharides was 74.4% and the recovery ratio of the heteropoly acid was 99.1%.

Comparative Example 1

Distilled water was placed in advance in a sealed reaction container, the temperature was raised to a predetermined reaction temperature (70° C.), a saturated vapor pressure state was obtained inside the container, and water vapor was caused to adhere to the inner surface of the container. Then, 1 kg of a heteropoly acid (phosphotungstic acid) for which the amount of water of crystallization has been measured in advance and distilled water (55.6 g) in an amount representing shortage of water (water of a saturated vapor pressure component at 70° C. was excluded) with respect to the sum total of the amount necessary to bring water of crystallization of the heteropoly acid to 100% and the amount of water (55.6 g) necessary to hydrolyze cellulose and obtain glucose were charged into the container and heated and stirred. Once the temperature inside the container reached 70° C., stirring was further continued for 5 min. Then, 0.5 kg of cellulose was charged (weight ratio of heteropoly acid to cellulose was 2:1), and mixing was conducted for 2 h at 70° C. The heating was then stopped, the container was opened, and the hydrolysis reaction mixture was cooled to room temperature, while discharging extra water vapor. Ethanol was then added in three cycles to the hydrolysis reaction mixture, stirring was performed, and the filtered material 3 (solid fraction including saccharides) and heteropoly acid ethanol solution were separated and recovered in the same manner as in Example 1. Distilled water was added to the solid fraction including the saccharides, and stirring was performed for 10 min. No residue could be confirmed to be present in the obtained aqueous solution, but the solution was still filtered and an aqueous saccharide solution was obtained. The yield of monosaccharides was 73.1% and the recovery ratio of the heteropoly acid was 99.7%.

Comparative Example 2

Distilled water was placed in advance in a sealed reaction container, the temperature was raised to a predetermined reaction temperature (70° C.), a saturated vapor pressure state was obtained inside the container, and water vapor was caused to adhere to the inner surface of the container. Then, 0.5 kg of cellulose was charged into the container. A total of 1 kg of a heteropoly acid (phosphotungstic acid) for which the amount of water of crystallization has been measured in advance, distilled water (55.6 g) in an amount representing shortage of water (water of a saturated vapor pressure component at 70° C. was excluded) with respect to the sum total of the amount necessary to bring water of crystallization of the heteropoly acid to 100% and the amount of water (55.6 g) necessary to hydrolyze cellulose and obtain glucose, and a heteropoly acid converted into a pseudo-molten state by heating to 70° C. were then charged into the container (weight ratio of heteropoly acid to cellulose was 2:1) and heated and stirred for 2 h at 70° C. However, stirring in the container did not proceed effectively, the temperature of heteropoly acid dropped, the pseudo-molten state could not be maintained, and only the bottom portion of the container was heated and blackened. The heating was then stopped, the container was opened, and the hydrolysis reaction mixture was cooled to room temperature, while discharging extra water vapor. Ethanol was then added in three cycles to the hydrolysis reaction mixture, stirring was performed, and the filtered material 3 (solid fraction including saccharides) and heteropoly acid ethanol solution were separated and recovered in the same manner as in Example 1. Distilled water was added to the solid fraction including the saccharides, and stirring was performed for 10 min. Because the residue (20 wt. % filtered material) was confirmed to be present in the obtained aqueous solution, the solution was filtered and an aqueous saccharide solution was obtained. The yield of monosaccharides was 34.3% and the recovery ratio of the heteropoly acid was 96.2%.

RESULTS. The charged amount of cellulose, amount of heteropoly acid used, yield of monosaccharides and recovery ratio of the heteropoly acid obtained in examples and comparative examples are shown in Table 1.

TABLE 1

|  | Charged amount of cellulose | Amount of heteropoly acid used | Yield of monosaccharides | Recovery ratio of the heteropoly acid |
|---|---|---|---|---|
| Example 1 | 0.5 kg | 250 g | 72.5% | 99.2% |
| Example 2 | 0.5 kg | 250 g | 74.4% | 99.1% |
| Comparative Example 1 | 0.5 kg | 500 g | 73.1% | 99.7% |
| Comparative Example 2 | 0.5 kg | 500 g | 34.3% | 96.2% |

As shown in Table 1, comparing Example 1 and Example 2 with Comparative Example 1, the ratio (weight ratio) of the amount of heteropoly acid used and the charged amount of cellulose was (cellulose:heteropoly acid=2:1) in Examples 1 and 2 and (cellulose:heteropoly acid=1:1) in Comparative Example 1, but the yield of monosaccharides and recovery ratio of heteropoly acid were the same.

Where Comparative Example 1 and Comparative Example 2 are compared, the difference therebetween is in that cellulose was charged into the container after charging the heteropoly acid that was converted into a pseudo-molten state by heating in Comparative Example 1, whereas the heteropoly acid that was converted into a pseudo-molten state by heating was charged after charging the cellulose into the container in Comparative Example 2. However, in Comparative Example 2 in which cellulose was the first to be charged, the temperature of heteropoly acid was reduced by the cellulose and the heteropoly acid assumed a solid state. As a result, the cellulose and heteropoly acid could not be effectively stirred, and the cellulose that was not in contact with the heteropoly acid at the bottom portion of the container was simply heated and burned. As a result, the amount of residue was large and the yield of the monosaccharide decreased greatly to 34.3%. As described above, in Comparative Example 1 and Comparative Example 2 in which the heteropoly acid is used in a pseudo-molten state, it is important to maintain the pseudo-molten state of the heteropoly acid. As a result, a limitation is placed on the order in which starting materials are charged into the container and also the temperature maintained inside the container.

By contrast, in Example 1 and Example 2, the organic solvent is used as a reaction catalyst and the heteropoly acid is dissolved in the organic solvent. Therefore, the dissolved state of the heteropoly acid is maintained and the miscibility of the heteropoly acid and cellulose and glycosylation reactivity of the cellulose are not affected even if the order of charging the organic solvent solution including the heteropoly acid and cellulose is changed. Thus, with the method in which a heteropoly acid is dissolved in an organic solvent and the organic solvent is used as a reaction solvent, it is not necessary to pay attention to the order in which starting materials are charged into the container and to maintain the temperature inside the container. Furthermore, the degree of freedom in designing the equipment is high.

The invention claimed is:

1. A method for hydrolyzing a plant fiber material to produce and separate a saccharide including glucose, comprising:
   a hydrolysis process of hydrolyzing cellulose contained in the plant fiber material and producing glucose in an organic solvent in which a cluster acid catalyst is dissolved, and
   a saccharide separation process of separating a reaction mixture after the hydrolysis process into a liquid fraction including the cluster acid catalyst and the organic solvent and a solid fraction including the saccharide,
   wherein the organic solvent is an alcohol having 6 to 10 carbon atoms, and is a high-boiling polar organic solvent that has a boiling point higher than a reaction temperature in the hydrolysis process and hardly dissolves the saccharide.

2. The method according to claim 1, wherein
a solubility of the cluster acid catalyst in the organic solvent is equal to or greater than 50 g/100 ml.

3. The method according to claim 1, wherein the boiling point of the organic solvent is equal to or higher than 90° C.

4. The method according to claim 1, wherein
a solubility of the saccharide in the organic solvent is equal to or less than 1.0 g/100 ml.

5. The method according to claim 1, wherein
a specific dielectric constant of the organic solvent is within a range of 8 to 18.

6. The method according to claim 1, wherein
the organic solvent is at least one from among 1-hexanol, 1-heptanol, 2-heptanol, 1-octanol, 2-octanol, 1-decanol, and 1-nonanol.

7. The method according to claim 1, wherein the hydrolysis process is performed under a pressure from a normal pressure to 1 MPa and at a temperature of equal to or lower than 140° C.

8. The method according to claim 1, wherein the cluster acid catalyst is a heteropoly acid.

9. The method according to claim 1, wherein
in the saccharide separation process, a further organic solvent, which is compatible with the organic solvent and has an ability to dissolve the cluster acid catalyst that is higher than that of the organic solvent and a boiling point that is lower than that of the organic solvent, is added to the reaction mixture after the hydrolysis process, and solid-liquid separation is performed into a liquid fraction including the cluster acid catalyst, the organic solvent, and the further organic solvent and a solid fraction including the saccharide.

10. The method according to claim 9, wherein
the further organic solvent and an organic solvent solution in which the cluster acid catalyst is dissolved in the organic solvent are separated by distillation of the liquid fraction.

11. The method according to claim 10, wherein
the further organic solvent includes at least one from among ethanol, methanol, n-propanol, diethyl ether, and diisopropyl ether.

* * * * *